UNITED STATES PATENT OFFICE.

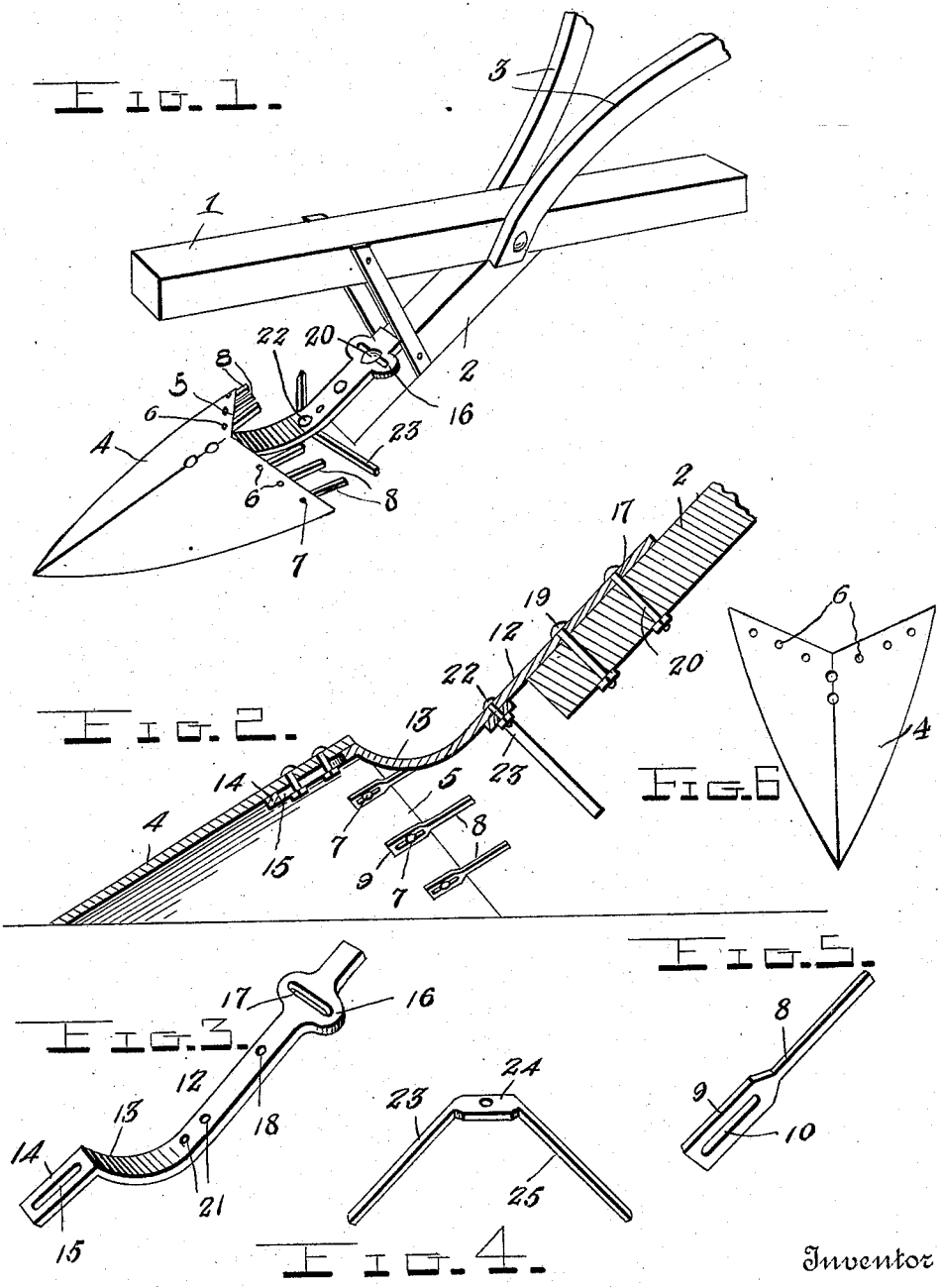

LEROY B. PENTON, OF VILLISCA, IOWA.

SURFACE-CULTIVATING SHOVEL.

No. 911,437.  Specification of Letters Patent.  Patented Feb. 2, 1909.

Application filed July 7, 1908. Serial No. 442,365.

*To all whom it may concern:*

Be it known that I, LEROY B. PENTON, a citizen of the United States, residing at Villisca, in the county of Montgomery and State of Iowa, have invented certain new and useful Improvements in Surface-Cultivating Shovels; and I do declare the following to be a full, clear, and exact description of the invention, such as will enable others skilled in the art to which it appertains to make and use the same.

This invention relates to improvements in surface cultivating shovels for plows or cultivators.

The object of the invention is to provide a cultivator shovel for shallow or surface cultivation, and to provide means whereby the weeds will be separated from and thrown up onto the soil where they will quickly wither and die; and, also, to provide means whereby the soil will be pushed or hilled up around the plants.

With these and other objects in view the invention consists of certain novel features of construction, combination and arrangement of parts as will be described and particularly pointed out in the appended claims.

In the accompanying drawing, Figure 1 is a perspective view of a portion of the cultivator showing the application of my improved shovel thereto; Fig. 2 is a vertical sectional view through the same; Fig. 3 is a detail perspective view of the shovel attaching shank; Fig. 4 is a detail perspective view of the dirt tumbler for pushing and hilling up the soil around the plants; and Fig. 5 is a detail perspective view of one of the weed separating teeth adapted to be applied to the rear edges of the shovel. Fig. 6 is a detail plan view of the plow blade or shovel.

Referring more particularly to the drawing, 1 denotes the plow or cultivator beam, to which is secured and firmly braced a standard, 2, and handles, 3. These parts may be of the usual or any preferred construction.

My improved shovel comprises a blade, 4, the edges of which taper from the rear end to the point of the shovel. The opposite sides of the blade are inclined from their outer side edges upwardly to the center of the blade, as shown. The rear end of the blade is provided with a V-shaped notch, 5, and along the edges of the notch, 5, is formed a series of bolt holes, 6, in which are arranged fastening bolts, 7, for the purpose of securing a series of weed separating teeth, 8, to said rear edges of the blade. The teeth 8 are provided with flattened shanks, 9, having formed therein longitudinally disposed slots, 10, in which the fastening bolts, 7, are engaged and whereby the teeth are secured in adjustable engagement with the blade.

Bolted or otherwise secured to the under side of the blade, adjacent to its rear edge, is an attaching shank, 12, said shank being preferably curved forwardly as shown at 13, and provided with a downwardly projecting angular or offset fastening extension, 14, having formed therein a longitudinally disposed slot, 15, to receive the bolts or other fastening devices which are passed through the shovel blade and through said slot to adjustably connect the blade with the shank. The upper end of the shank is increased in width, as shown at 16, and in said widened portion is formed a transversely disposed slot, 17. In the shank, below the slot, 17, is formed a pivot hole, 18, to receive a fastening bolt, 19, whereby the shank is pivotally secured to the plow standard. The slot, 17, is provided to receive a clamping bolt, 20, also arranged in the plow standard and adapted to securely clamp the shank in its adjusted position on the standard.

Below the bolt hole, 18, in the shank are formed two or more bolt holes, 21, to receive the fastening bolt, 22, of a dirt tumbler, 23, which is adapted to be secured to the shank below the end of the standard and above the upper or rear edge of the shovel, as shown. The tumbler, 23, comprises a central flattened apertured attaching portion, 24, and oppositely-projecting, rearwardly-inclined operating arms or bars, 25, which are adapted to engage the soil after being worked by the shovel and to assist in fining the soil, and also pushing or hilling the same up around the plants.

My improved shovel is intended for the shallow cultivation of corn or other plants and for the removal of weeds, the separation of the latter from the soil being provided for by the teeth, 8, which lift the weeds and shake the same from the soil and leave them exposed upon the surface where they will wither and dry up in the sun.

The cultivating operation of the shovel is materially assisted by the provision of the dirt tumbler which serves to throw the dirt to each side and to hill the same up around the plants.

From the forgoing description, taken in connection with the accompanying drawing, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim as new and desire to secure by Letters-Patent, is:

1. A surface cultivating shovel comprising a blade, an offset attaching shank secured to said blade, means whereby said shank is pivotally and adjustably secured to the standard of the plow, a dirt tumbler secured to said standard, and a series of weed-separating devices connected to said shovel blade.

2. A surface cultivating shovel comprising a blade having upwardly inclined sides, a curved or offset attaching shank having an angular blade attaching portion at one end, a transversely slotted enlargement at its opposite ends, a bolt hole to receive the pivot bolt whereby the same is fastened to the standard of a cultivator, a dirt tumbler secured to said cultivator, a dirt having rearwardly and outwardly projecting soil-engaging arms, and means to separate the weeds from the soil.

3. A surface cultivating shovel comprising a blade, the side edges of which are tapered forwardly to a point and having in its rear edge a V-shaped notch, an offset attaching shank secured to said blade, means to adjustably secure said shank to the standard of a plow or cultivator, and a series of adjustable weed-separating teeth secured to the V-shaped rear edge of the blade.

4. A surface cultivating shovel comprising a blade, means to adjustably secure the blade to the standard of a plow or cultivator, a series of weed-separating teeth secured to the rear edge of the shovel, said teeth having a slotted shank whereby the same are adjustably connected to the blade, and means whereby the cultivated soil is hilled up against the plants.

In testimony whereof I have hereunto set my hand in presence of two subscribing witnesses.

LEROY B. PENTON.

Witnesses:
S. H. COLEMAN.
E. NORTHUP.